United States Patent
Iverson (10) Patent No.: US 12,048,299 B2
(45) Date of Patent: Jul. 30, 2024

(54) FISHING ROD TRANSPORT

(71) Applicant: Todd J. Iverson, Reno, NV (US)

(72) Inventor: Todd J. Iverson, Reno, NV (US)

( * ) Notice: Subject to any disclaimer, the term of this patent is extended or adjusted under 35 U.S.C. 154(b) by 0 days.

(21) Appl. No.: 17/341,114

(22) Filed: Jun. 7, 2021

(65) Prior Publication Data

US 2021/0378223 A1 Dec. 9, 2021

Related U.S. Application Data

(60) Provisional application No. 63/035,658, filed on Jun. 5, 2020.

(51) Int. Cl.
*A01K 97/08* (2006.01)

(52) U.S. Cl.
CPC .................... *A01K 97/08* (2013.01)

(58) Field of Classification Search
CPC ........ A01K 97/08; A01K 87/00; A01K 97/06; A01K 97/10; B60R 9/08; B60R 9/12
USPC ....... 43/26, 21.2, 54.1, 18.1 CT; 206/315.11; 224/922, 920; 211/70.8; 311/70.8
See application file for complete search history.

(56) References Cited

U.S. PATENT DOCUMENTS

| | | | | |
|---|---|---|---|---|
| 3,406,930 | A | | 10/1968 | Seiler |
| 4,311,262 | A | * | 1/1982 | Morin .................... A01K 97/10 206/443 |
| 4,827,658 | A | * | 5/1989 | Wolniak ................. A01K 97/06 43/57.1 |
| 4,858,366 | A | * | 8/1989 | Rushton ................. A01K 97/08 43/26 |
| 5,092,463 | A | * | 3/1992 | Dees ....................... B25H 3/04 29/469 |
| 5,586,515 | A | | 12/1996 | Nickles |
| 5,836,103 | A | | 11/1998 | Taylor |
| 6,364,150 | B1 | * | 4/2002 | Persinger ............... A01K 97/06 220/735 |
| 6,755,311 | B2 | * | 6/2004 | Berry ...................... B25H 3/04 248/512 |
| 6,883,268 | B2 | * | 4/2005 | Fraser .................... A01K 97/22 248/512 |
| 6,983,854 | B2 | * | 1/2006 | Pleiman .................. B25H 3/04 211/70.6 |
| 7,150,123 | B1 | * | 12/2006 | Fox ........................ A01K 97/06 43/54.1 |

(Continued)

OTHER PUBLICATIONS

Screen captures from YouTube video clip entitled "DIY Series: Truck Rod Tubes, AKA Rocket Launchers . . . A step by step how to!!! ," 2 pages, uploaded on May 29, 2020 by user "Sophisticated Redneckery." Retrieved from Internet: <https://www.youtube.com/watch?v=9V_uMcg-FMA>.

(Continued)

*Primary Examiner* — Timothy D Collins
*Assistant Examiner* — Maria E Graber
(74) *Attorney, Agent, or Firm* — Todd J. Iverson (57) ABSTRACT

The present disclosure describes a fishing rod transport that includes a rear structural support, a plurality of rod supports attached to the rear structural support, and a reel compartment attached to the rear structural support. A first rod support extends through a first hole in the rear structural support, a second rod support extends through a second hole in the rear structural support, and a center of the first hole is disposed vertically higher than a center of the second hole.

17 Claims, 5 Drawing Sheets

(56) References Cited

U.S. PATENT DOCUMENTS

| | | | | |
|---|---|---|---|---|
| 7,594,353 | B2* | 9/2009 | Lucky | A01K 97/10 |
| | | | | 248/512 |
| 7,676,983 | B2* | 3/2010 | Jenkins | A01K 97/08 |
| | | | | 248/512 |
| D653,446 | S | 2/2012 | Bode | |
| 8,783,748 | B1* | 7/2014 | Quinn | A01K 97/08 |
| | | | | 294/159 |
| 9,137,981 | B1* | 9/2015 | Groves, Jr. | A01K 97/08 |
| 10,149,537 | B2* | 12/2018 | Johnson | A47F 7/0028 |
| 10,375,944 | B2 | 8/2019 | Smigaj et al. | |
| 10,542,738 | B2 | 1/2020 | Moses et al. | |
| D881,599 | S | 4/2020 | Jacobs | |
| D881,600 | S | 4/2020 | Jacobs | |
| D891,768 | S | 8/2020 | McGowan | |
| D897,099 | S | 9/2020 | McFadden et al. | |
| 2006/0207161 | A1 | 9/2006 | Lynn | |
| 2006/0277814 | A1* | 12/2006 | Lucky | A01K 97/10 |
| | | | | 43/21.2 |
| 2015/0359210 | A1* | 12/2015 | Rossi | A01K 97/10 |
| | | | | 43/21.2 |
| 2018/0084909 | A1* | 3/2018 | Johnson | A01K 97/08 |
| 2019/0193641 | A1* | 6/2019 | Garza, Jr. | B60R 9/08 |
| 2020/0085027 | A1* | 3/2020 | Crawford | A01K 97/08 |
| 2020/0282917 | A1 | 9/2020 | Sagen et al. | |
| 2020/0307464 | A1* | 10/2020 | McFadden | A01K 97/10 |

OTHER PUBLICATIONS

Screen captures from YouTube video clip entitled "DIY Roof Rack Fishing Rod Storage," 3 pages, uploaded on Nov. 5, 2018 by user "Heath Panganiban." Retrieved from Internet: <https://www.youtube.com/watch?v=oCgLmeeoN7Y>.

Screen captures from YouTube video clip entitled "DIY Rod Protection (rod tube)," 1 page, uploaded on Feb. 22, 2019 by user "IL_Outdoorsman." Retrieved from Internet: <https://www.youtube.com/watch?v=9d6Vzt10pws>.

Screen captures from YouTube video clip entitled "How I Made my Rod Pod for less $100. It saves you about $400," 1 page, uploaded on Jun. 9, 2016 by user "Flukemaster." Retrieved from Internet: <https://www.youtube.com/watch?v=tq-aGLVfbTs>.

Screen captures from YouTube video clip entitled "Kayak Trailer Build | DIY Rod Pod | 2020 Kayay Cart," 1 page, uploaded on Apr. 27, 2019 by user "Kayak USA." Retrieved from Internet: <https://www.youtube.com/watch?v=txz5ZptLeaE>.

Screen captures from YouTube video clip entitled "Making a Rod Tube," 3 pages, uploaded on May 19, 2017 by user "Maine Trout Whisperer." Retrieved from Internet: <https://www.youtube.com/watch?v=UBg2N4flNg4>.

Screen captures from YouTube video clip entitled "DIY Rod Tube for less than $100," 2 pages, uploaded on Mar. 26, 2019 by user "Bassin W Watts." Retrieved from Internet: <https://www.youtube.com/watch?v=Sf1s4k1piGg>.

Screen captures from YouTube video clip entitled "Denver Outfitters | How it's Made | Fly Fishing Rod Vault (Full)," 4 pages, uploaded on Nov. 10, 2015 by user "Denver Outfitters." Retrieved from Internet: <https://www.youtube.com/watch?v=xJdZpRPWVsA>.

Screen captures from YouTube video clip entitled "ROD-UP for Trucks with Pass-Thru Windows," 1 page, uploaded on Jun. 27, 2016 by user "RodMounts." Retrieved from Internet: <https://www.youtube.com/watch?v=gHm9_szH8k8>.

* cited by examiner

FISHING ROD TRANSPORT

RELATED APPLICATIONS

This patent application claims the priority benefit of U.S. Provisional Patent Application Ser. No. 63/035,658, filed on Jun. 5, 2020 and entitled "FISHING ROD TRANSPORT," which is incorporated herein by reference in its entirety for all purposes and all teachings contained therein.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates generally to systems and devices for transporting fishing rods and methods of manufacturing same.

BACKGROUND

Valuable sporting gear such as bikes, kayaks, skis, etc., are often transported on vehicles using cargo rack systems, or "roof racks," which are ubiquitous on the roads of America today. Numerous manufacturers offer a dizzying array of products that provide exterior cargo-carrying capability for cars, vans, and Sport-Utility Vehicles (SUVs) of any size. There are even cargo rack systems for vehicles that already possess significant exterior or cargo-carrying capability, such as pick-up trucks. However, even the extended above-cab cargo racks that are made for pick-up trucks are typically less than 12' long.

A salient feature of many cargo rack systems is a set of cross-bars that extends horizontally across the top of a vehicle, arranged in a manner that is generally perpendicular to a length of the vehicle. Many vehicles come off the assembly line with cross-bars already installed. If not, cargo rack manufacturers offer cross-bar solutions that are appropriate for any vehicle. Once a set of cross-bars is fitted to a vehicle, cargo baskets and other accessories designed to carry particular sorts of items (e.g., skis, bicycles, kayaks) safely and securely) may then be attached to the cross-bars.

BRIEF DESCRIPTION OF THE DRAWINGS

While the inventive aspects disclosed herein are susceptible to various modifications and alternative forms, specific embodiments are shown by way of example in the drawings, which are briefly described below, as well as described in detail in the following written description. It should be understood, however, that the invention is not intended to be limited to the relatively small number of particular embodiments that are disclosed. Rather, the invention is intended to cover all modifications, equivalents, and alternatives falling within the spirit and scope of the invention as defined by the appended claims, as amended and clarified during the process of examination at the US Patent and Trademark Office.

FIGS. 1-12 are not necessarily drawn to scale. Rather, the various features of the illustrated example embodiments may be enlarged relative to other features for illustrative purposes and to more effectively convey the inventive aspects disclosed. Similarly, for convenience and ease of illustration, FIGS. 1-5, 8, and 12 utilize wavy lines (either solid or dashed) to indicate that portions of the illustrated embodiments are omitted. These omitted portions are not required for an understanding of the inventive aspects that are illustrated and described. Similarly, for convenience and ease of illustration, and to more effectively convey inventive aspects, some components may not be illustrated in all the figures.

If any particular dimension is contemplated for a feature or component of the disclosed embodiments (e.g., a particular length, width, diameter, thickness, etc.), that value is specified in the written description associated with that feature or component. The actual dimensions of embodiments incorporating the inventive aspects disclosed herein may vary depending on design constraints and personal preferences.

FIGS. 1-12 illustrate a large number of components or elements. For convenience and ease of explanation, if an element has been identified in an earlier figure (e.g., FIG. 1) and described in the written description associated with that earlier figure, the same component appearing in a later figure (e.g., FIG. 5) may not be identified in the later figure or described in the written description associated with the later figure.

Like numerical references refer to like elements throughout. With two exceptions, both of which are found in FIG. 11 (washer 1102 and u-bolt backing plate 1104), the first digit of the numerical reference indicates the corresponding figure where the element or component associated with the numerical reference was first identified.

DETAILED DESCRIPTION

In today's world of ultra-expensive fishing equipment, and in particular, ultra-expensive fly-fishing equipment, there is a need to safely and securely transport fly-rods, fly-reels, and fly-lines. There is a also a need to transport fly-rods, fly-reels, and fly-lines that are fully assembled, rigged, and ready to be cast, which maximizes the time that a fly-fisher actually spends fishing while on the water, as opposed to arriving at the fishing location and then assembling the fly-rod and fly-reel, making any adjustments required to the leader that is attached to the fly-line, and tying on one (or more) appropriate flies. Any fisherman would agree that time spent on the water, but not having a line in the water, is wasted time.

Fly-fishers would benefit from having a fly-rod transport that enabled them to securely transport even the longest fly-rods, which can be up to 15' long, without needing a pick-up truck or cargo van with an extra-long cargo rack to do it. Fly-fishers would also benefit from having a fly-rod transport that allowed them to transport as many assembled fly-rods and fly-reels as desired, without unnecessarily sacrificing valuable space on the top of their vehicles that could be used to carry other items. The example embodiments described herein may address one or more of these needs, as well as others.

In the following detailed description, specific values of length, width, diameter, etc., may be disclosed using Imperial units of measure (e.g., inches), metric units of measure (e.g., millimeters (mm) or centimeters (cm)), or both. Inches may be converted to millimeters, or vice versa, using the familiar conversion of 1 inch=25.4 mm. Units of feet may be indicated by the prime symbol (e.g., 6 feet=6'), and inches may be indicated by the double prime symbol (e.g., 6 inches=6"). Angular measures, i.e., degrees, may be indicated using the degree symbol (e.g., sixty degrees=60°).

Some of the inventive aspects disclosed herein may only be illustrated and described in association with one of the accompanying Figures. However, any number of additional embodiments can be constructed that include at least one of the disclosed inventive teachings, or any combination of the disclosed inventive teachings. Therefore, the relatively small number of embodiments that are disclosed herein should not be considered as limiting in any way, but rather as representative examples that are illustrative of inventive aspects that could appear in any number of embodiments, in any combination.

There may be terms used in this written description that suggest or imply a precise geometric meaning, e.g., terms such as "parallel," "perpendicular," "tangent," "bisect," and "coplanar." These terms are useful for describing a desired positional relationship between different elements of the example embodiments, but it should not be inferred that the use of such terms in this specification, or in other applications that claim priority to this application, means that all embodiments must have this precise geometric relationship.

Those familiar with manufacturing processes and engineering tolerances understand that a certain amount of variation in physical dimensions and measured values may be present without significantly affecting the intended function of systems and structures. Thus, words of approximation, such as "about," "almost", "substantially," "approximately," and the like, may be used herein in the sense of "at, near, or nearly at," or "within 0-5% of," or "within acceptable manufacturing tolerances," or any logical combination thereof, for example. For purposes of this disclosure, the words "including," "comprising," and "having" shall mean "including without limitation."

One of the disadvantages that exist with existing fishing rod transports, and in particular, fly-rod transports, is the relatively high cost, which is often as much as or more than the cost of a modern graphite fly rod itself. The example embodiments illustrated and described herein were born in part from a desire to obtain a safe and secure fishing rod transport that could be easily built by most people with basic woodworking/metalworking skills and commonly available tools, at a fraction of the cost of the existing fishing rod transports that are on the market today. In furtherance of this goal, as the reader studies the example embodiments illustrated by the accompanying detailed figures and discussed in this written description, a common theme will become apparent, namely, the extensive usage of Commercial, Off The Shelf (COTS) components.

For purposes of this disclosure, COTS components may be considered materials that are ready-made and available for sale to the general public through commercial sources such as building supply stores, restaurant supply stores, hardware stores, and the like. In fact, for the example embodiments illustrated and described herein, every component used to fabricate the embodiment is a COTS component.

The stated goal of maximizing the use of COTS components in order to minimize cost should not be considered as limiting the inventive teachings of this disclosure in any way. The reader of this disclosure will recognize that many of the inventive teachings described herein may be achieved and accomplished using more advanced manufacturing techniques as well, such as welding (of metal) or molding (of plastics).

Figures 1, 2:
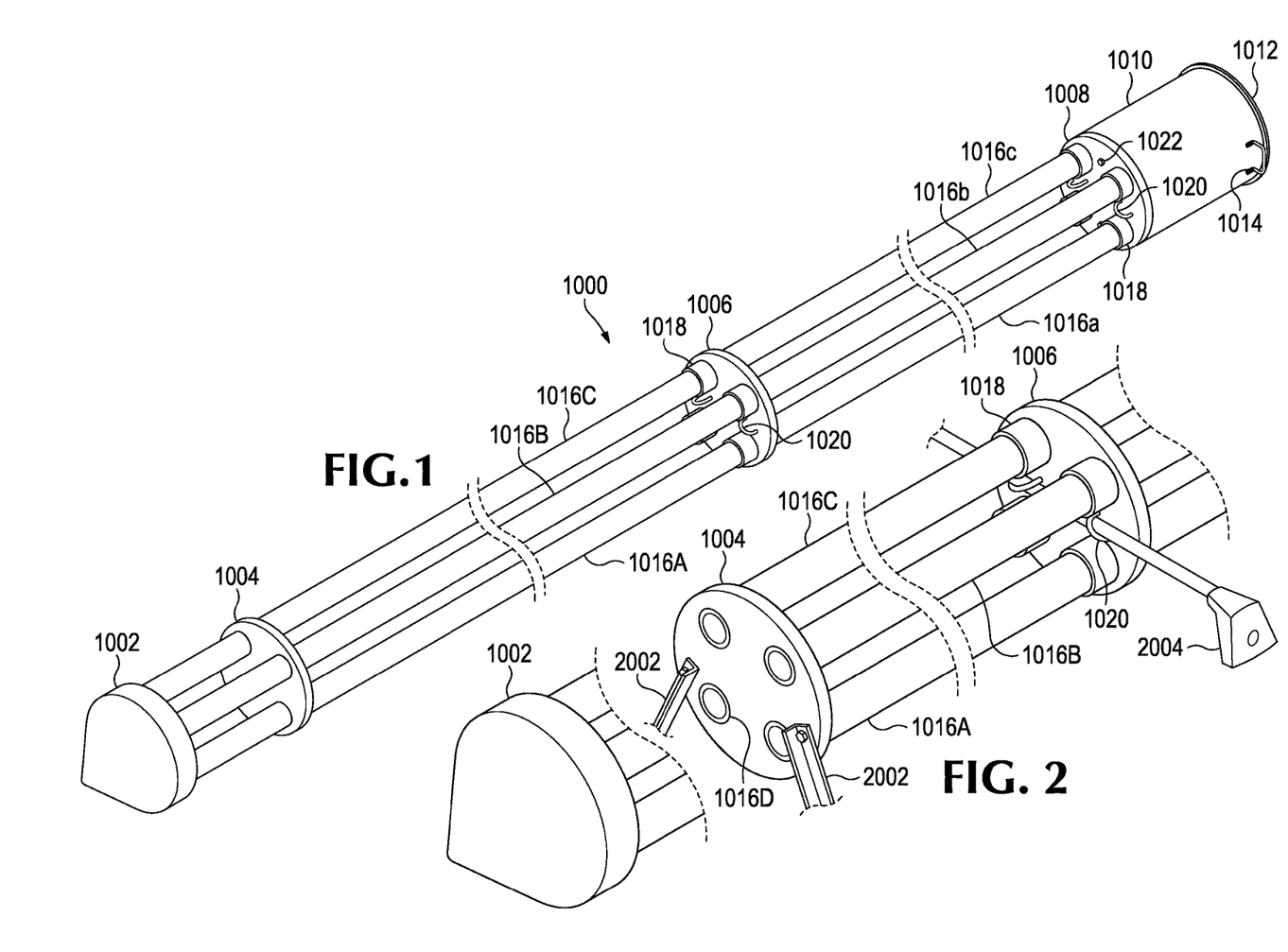
FIG. 1 is a perspective diagram that illustrates some components of a fishing rod transport in accordance with some example embodiments.
FIG. 2 is a perspective diagram that illustrates a portion of the fishing rod transport of FIG. 1 in additional detail.
Figure 3:
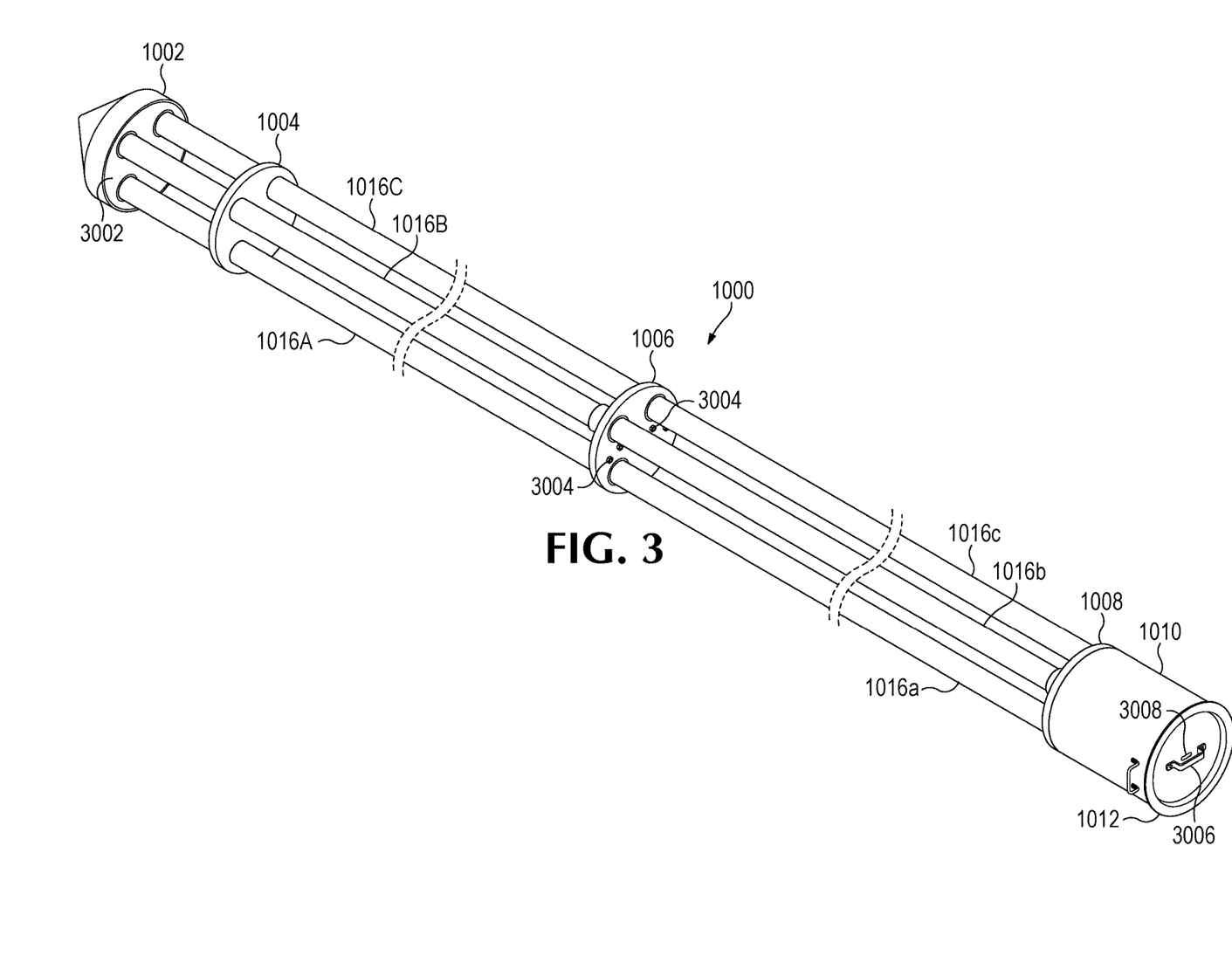
FIG. 3 is another perspective diagram that illustrates the fishing rod transport of FIG. 1 in additional detail.

To obtain a general overview of some of the major components of a fishing rod transport 1000 according to some preferred example embodiments, reference is now made to FIGS. 1-3, where FIG. 1 is a perspective diagram of a fishing rod transport 1000 in accordance with some example embodiments, FIG. 2 is a perspective diagram illustrating a portion of fishing rod transport 1000 in additional detail, and FIG. 3 is another perspective diagram (but a different perspective from FIGS. 1 and 2) that also illustrates fishing rod transport 1000 in additional detail. For convenience, fishing rod transport 1000 may simply be referred to as transport 1000 for the remainder of this disclosure.

Starting at the lower left corner of the page that includes FIG. 1 (from the viewer's perspective) and moving towards the upper right corner of the page, transport 1000 includes an optional fairing 1002, an optional floating structural support 1004, a middle structural support 1006, and a rear structural support 1008. As seen in FIG. 3, transport 1000 also includes a front structural support 3002.

Preferably, as is shown in FIGS. 1-3, the structural supports 3002, 1004, 1006, and 1008 are all approximately circular in shape, and are fabricated from exterior-grade plywood having a thickness of ¾". In alternative embodiments, the structural supports 3002, 1004, 1006, and 1008 may be fabricated from different materials such as plastic, aluminum sheet metal, or stainless steel sheet metal. In alternative embodiments, for additional durability and strength, but perhaps at a cost of greater weight, structural supports having multiple layers of any of the aforementioned materials could be used. For the prototype fishing rod transport that is nearing completion as of this writing (hereafter, "Prototype"), ¾" plywood was chosen because it is strong, lightweight, easily workable with common power or hand tools, and also widely available at building supply and hardware stores.

In preferred embodiments, the optional fairing 1002 is a cone-shaped dock piling cap, or piling cap, which has a substantially circular base. Piling caps are COTS components that are designed to fit over dock pilings and protect the dock pilings from rot and deterioration due to a wet or marine environment. Piling caps may be cone-shaped, as shown in FIGS. 1-4, 8, and 12, but they may also be shaped like a pyramid having a square base (to fit on square-shaped pilings). Alternatively, piling caps with both square and circular bases may have a simple, flat top. Piling caps are manufactured with circular bases in different diameters or with square bases in a range of side lengths in order to accommodate the variety of sizes of dock pilings.

In transport 1000, an OD of front structural support 3002 is preferably fabricated such that it about the same as an Inner Diameter (ID) of fairing 1002. Fairing 1002 can then be positioned around front structural support 3002, and secured to front structural support using screws or nails. While fairing 1002 is optional, it is preferred because it does provide a measure of protection from inclement weather and also improves an aerodynamic profile of transport 1000. For the Prototype, an ID of the piling cap that was used as fairing 1002 was about 10", and a length of the piling cap was about 7".

Transport 1000 additionally includes a reel compartment 1010, a reel compartment cover 1012, handles 1014, and a cover handle 3006 that is riveted to the cover 1012. Reel compartment 1010 is secured to rear structural support 1008 by one or more bolts 1022. Preferably, although it is not required, an OD of rear structural support 1008 is approximately the same as an OD of reel compartment 1010. For convenience, reel compartment 1010, reel compartment cover 1012, handles 1014, and cover handle 3006, along with additional components housed in the interior of reel compartment 1010 (and are not visible in FIGS. 1-3) are collectively referred to as reel compartment assembly 6000 for the remainder of this disclosure. Additional details of reel compartment assembly 6000 will be presented below with reference to FIGS. 6 and 7.

The alert reader will notice that reel compartment 1010, reel compartment cover 1012, handles 1014, and cover handle 3006 looks suspiciously like a common kitchen stock pot that is typically used for cooking soups and stews. This is no coincidence. Aluminum stock pots are COTS components. Aluminum stock pots are lightweight, strong, and corrosion resistant. Aluminum is a relatively soft metal that can be easily cut and drilled using the proper tools. Aluminum stock pots are also widely available in many different sizes, and the aluminum stock pot that the illustrations are based upon has an ID of about 9", an overall length of about 12", an interior volume of about 16 quarts, and a wall thickness of about 4 mm.

In alternative embodiments, a Stainless Steel (SS) stock pot may be used instead of an aluminum stock pot. In other, more expensive, alternative embodiments, reel compartment 1010 may be manufactured separately from aluminum sheet metal, SS sheet metal, plain steel sheet metal, or from plastic through a molding process. However, there are advantages to using a plain aluminum stock pot for the reel compartment 1010, one of them being that handles 1014 can serve as convenient anchoring points for a conventional tie-down strap (not shown) having a ratcheting mechanism. Such a tie-down strap can hold reel compartment cover 1012 securely against the reel compartment 1010, preventing the ingress of wind and rain. If the conventional tie down strap is passed through the cover handle 3006, it will also prevent the cover handle from falling off completely should it somehow become loose.

As shown in FIG. 3, reel compartment cover 1012 has a small rectangular slot 3008 cut into it, behind the cover handle 3006. The purpose of slot 3008 will be explained in further detail below with reference to FIGS. 6 and 7.

Referring again to FIGS. 1-3, transport 1000 additionally includes four (4) front rod supports 1016A, 1016B, 1016C, and 1016D, as well as four (4) rear rod supports 1016a, 1016b, 1016c, and 1016d. The reader will note that in FIGS. 1-3, front rod support 1016D and rear rod support 1016d are obscured by front rod support 1016B and rear rod support 1016d, respectively, but these components are illustrated elsewhere, e.g., in FIG. 4. For convenience, the remainder of this disclosure may refer to front rod supports 1016A-1016D and rear rod supports 1016a-106d collectively as rod supports 1016.

Preferably, each of the front rod supports 1016A-1016D and each of the rear rod supports 1016a-1016d is a single piece of Acrylonitrile Butadiene Styrene (ABS) pipe having a nominal Outer Diameter (OD) of 1.5", although in alternative embodiments Polyvinyl Chloride (PVC) pipe having the same diameter may also be used. Both ABS and PVC pipe are COTS components that can be purchased in hardware and plumbing supply stores in 10' lengths. Both ABS and PVC pipe can easily be cut to a desired length using a hack saw. In some other alternative embodiments, rod supports 1016 may be fabricated from metal, such as electrical conduit, which may also be easily cut to the desired length with a hack saw.

The length of the front rod supports 1016A-1016D is preferably the same, as is the length of the rear rod supports 1016a-1016d. However, the length of the front rod supports 1016A-1016D and the length of the rear rod supports 1016a-1016d will typically be different, although in some embodiments they could be the same. The actual length of front rod supports 1016A-106D and rear rod supports 1016a-1016d is a design choice that is based both upon the desired overall length of the fishing rods that transport 1000 is to carry, as well as a distance between two fixed points that middle structural support 1006 and rear structural support 1008 are to be attached to.

For example, FIG. 2 illustrates a typical conventional cross-bar 2004 that is broadly representative of any cross-bar that forms part of a cargo rack system on a vehicle, whether factory installed or installed after purchase of the vehicle. Most conventional cross-bars 2004 may be adjusted such that the distance between them can be set to a desired value. Once they are adjusted to this desired value, however, they may be considered a fixed point on the vehicle for purposes of this disclosure.

As shown in FIG. 2, cross-bar 2004 is secured to middle structural support 1006 by two u-bolts 1020, which pass through holes in middle structural support 1006 and are secured on the other side of middle structural support by nuts 3004 (shown in FIG. 3). Rear structural support 1008 also includes two u-bolts 1020. The u-bolts 1020 on rear structural support 1008 pass through holes in rear structural support 1008 as well as matching holes in reel compartment 1010. Another cross-bar (not shown, but for purposes of this disclosure may be considered the same as cross-bar 2004), passes through u-bolts 1020 on rear structural support 1008, where additional nuts 3004 located in the interior of reel compartment 1010 secure the reel compartment assembly 6000 to the cross-bar.

Thus, middle structural support 1006 and rear structural support 1008, through the use of u-bolts 1020 and nuts 3004, may be considered to be attached to two fixed points on a vehicle. Consequently, according to example embodiments, a length of rear rod supports 1016a-1016d is selected such that it is approximately the same as a distance between whatever two fixed points that middle structural support 1006 and rear structural support 1008 are attached to, regardless of whether these two fixed points are conventional cross-bars 2004, as shown in FIG. 2, or whether the two fixed points are horizontal members of a conventional cargo rack (not shown).

Those of ordinary skill will appreciate that in alternative embodiments the placement and orientation of u-bolts 1020 on middle structural support 1006 and rear structural support 1008 may differ substantially depending on the particular conventional cross-bar 2004 or conventional cargo rack (not shown) that a fishing rod transport is to be attached to. Indeed, other than the u-bolts 1020, there may be any number of ways (e.g., brackets and screws, tie-downs, clamps) in which example embodiments may be affixed to conventional cross-bars and conventional cargo rack systems.

In the Prototype that FIGS. 1-12 are based upon, a length of front rod supports 1016A-1016D was selected to be about 9', while a length of rear rod supports 1016a-1016d was selected to be about 5', which happens to be the distance between two horizontal members of the conventional cargo-rack (not shown) that transport 1000 was designed for. As mentioned above, since a length of reel compartment 1010 is about 12", and a length of fairing 1002 is about 7", an overall length of transport 1000 is about 15' 7". This length is more than enough to accommodate even the longest fly rods, which can reach up to 15'. In alternative embodiments, when only shorter fly-rods (9' to 10') are being transported, an overall length of rod supports 1016 may be adjusted accordingly.

Because an overall length of transport 1000 was so long (about 15' 7"), and the length of the vehicle that the Prototype was attached to (2004 Land Rover Discovery 2, not shown) was only about 15', accommodations were made to support the forward end of the front rod supports 1016A-1016D using the front bumper of the vehicle. This was accomplished by the floating structural support 1004, together with bipod 2002, which is shown in FIG. 2. Bipod 2002 was fabricated from lengths of aluminum angle, and extends vertically downward at an angle, connecting to custom brackets (not shown) that attach bipod 2002 to the bumper of the vehicle. In alternative embodiments, bipod 2002 may instead be attached to front structural support 3002 instead of floating structural support 1004. In some other alternative embodiments, bipod 2002 and floating structural support 1004 may not be required at all.

In accordance with example embodiments, a fishing rod transport includes at least two structural supports that are attached to two corresponding fixed points on a vehicle. For example, while transport 1000 includes four structural supports (front structural support 3002, floating structural support 1004, middle structural support 1006, and rear structural support 1008), three of which are attached to fixed points on the vehicle (the floating structural support at the front bumper, the middle structural support at the front of the cargo rack, and the rear structural support at the rear of the cargo rack), depending on the materials used for the rod supports 1016 and an overall length of rod supports 1016, there may only be a need for two structural supports.

Transport 1000 additionally includes twelve (12) pipe couplings 1018 that are designed to join two sections of 1.5" ABS pipe. Pipe couplings 1018 are COTS components that are easily obtainable from hardware or building supply stores. Four pipe couplings 1018 are affixed to rear structural support 1008, another four pipe couplings 1018 are affixed to middle structural support 1006, and a remaining four pipe couplings (not shown) are affixed to front structural support 3002.

To permanently affix pipe couplings 1018 to the front, middle and rear structural supports 3002, 1006, and 1008, respectively, four (4) holes of the appropriate diameter are first drilled out of the front, middle, and rear structural supports at desired locations in each structural support. That is, four (4) holes that are slightly larger than an OD of the pipe couplings 1018 should be drilled through the front, middle, and rear structural supports 3002, 1006, and 1008 at the same relative locations on each structural support. Construction adhesive or epoxy is then used to coat the outside of the pipe couplings 1018 and the inside of the holes in the structural supports, and the pipe couplings are positioned at the desired location within the holes. Preferably, pipe couplings 1018 are clamped in place on the corresponding structural support while the adhesive or epoxy dries. Once the pipe couplings 1018 are securely affixed to the structural supports 3002, 1006, and 1008, front rod supports 1016A-1016D and rear rod supports 1016a-1016d may be inserted into the corresponding pipe couplings on the front, middle, and rear structural supports.

Floating structural support 1004 is somewhat different from the other three structural supports 3002, 1006, and 1008 in that it does not have pipe couplings 1018 affixed thereto. As noted above, because ABS pipe is sold in 10' sections, and the length of front rod supports 1016A-1016D is only 9', there is no need to join two separate sections of ABS pipe at the floating structural support 1004. Instead, holes that are sized to accommodate the front rod supports 1016A-1016D are simply drilled in the floating structural support 1004 at the desired location, and the front rod supports are inserted into the holes of the floating structural support before the front rod supports are placed in the pipe couplings 1018 of the front structural support 3002 and the middle structural support 1006.

Preferably, the front rod supports 1016A-1016D are not glued, cemented, or otherwise affixed inside the floating structural support 1004, although this could be done if so desired. Leaving the front rod supports 1016A-1016D free or "floating" allows the transport 1000 to be disassembled and stored easily in smaller pieces. Preferably, the rod supports 1016 are also not glued or otherwise affixed inside the pipe couplings 1018 of the front, middle, or rear structural supports 3002, 1006, and 1008, although this could also be done if so desired. Leaving the rod supports 1016 free or "floating" inside the pipe couplings 1018 also allows the transport 1000 to be disassembled and stored easily in smaller pieces.

Because rear rod supports 1016a-1016d are placed between the middle and rear structural supports 1006, 1008, which are attached to the vehicle at fixed points by the u-bolts 1020, there is no danger that rear rod supports 1016a-1016d can work themselves loose and fall out of the pipe couplings 1018. However, front rod supports 1016A-1016D may be susceptible to working themselves loose and falling out of the pipe couplings 1018. A method of addressing this concern is discussed below, with reference to FIGS. 4 and 5.

Figures 4, 5:
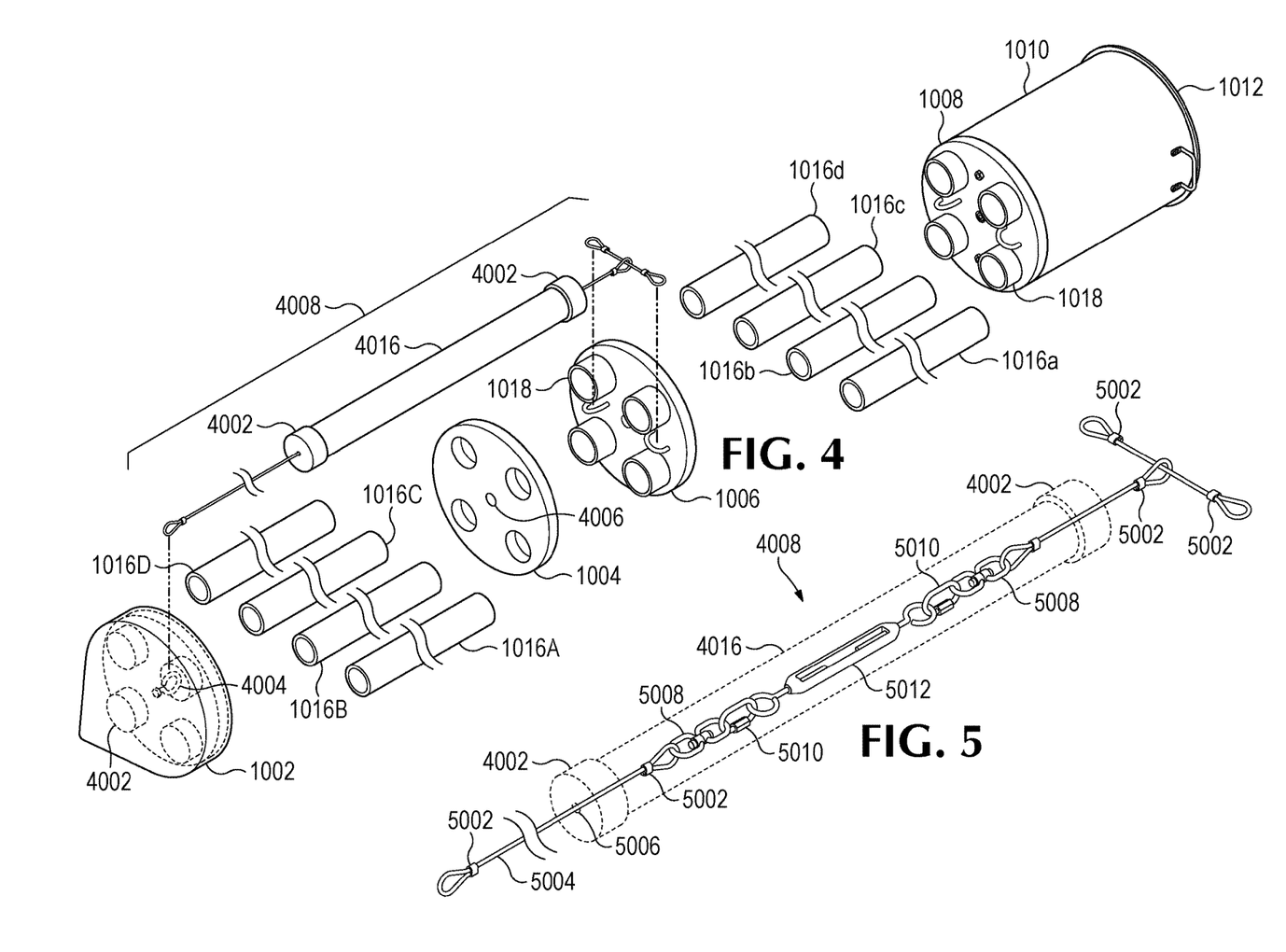
FIG. 4 is a perspective, exploded view diagram that illustrates the fishing rod transport of FIG. 1 in additional detail, and also illustrates an optional tensioning device in accordance with alternative example embodiments.
FIG. 5 is a perspective diagram that illustrates the tensioning device of FIG. 4 in additional detail.

FIG. 4 is a perspective, exploded view diagram that illustrates fishing rod transport 1000 in additional detail, and also illustrates an optional tensioning device 4008 in accordance with some preferred example embodiments. FIG. 5 is a perspective diagram that illustrates the tensioning device 4008 of FIG. 4 in additional detail.

Referring to FIG. 4, dashed lines are used to indicate four (4) pipe caps 4002, and an eye bolt/nut assembly 4004, which are preferably included in transport 1000. The dashed lines indicate that the pipe caps 4002 and eye bolt/nut assembly 4004 are normally not visible because, in this view, they are disposed inside or behind other components. In the view of FIG. 4, pipe caps 4002 are covered by fairing 1002, while eye bolt/nut assembly 4004 is obscured because a portion of it lies behind front structural support 1002, and the portion of it that lies in front of the front structural support 1002 is covered by fairing 1002.

Pipe caps 4002 are designed to fit over and seal off the ends of 1.5" ABS pipe. Pipe caps 4002 are COTS components that are easily obtainable from hardware or building supply stores. As was explained above, front structural support 3002 has four pipe couplings 1018. Since pipe caps 4002 are designed to fit over ABS pipe, and not pipe couplings 1018, transport 1000 additionally includes small lengths of ABS pipe (not shown) that are inserted into the "forward" end of the pipe couplings 1018 that are affixed to front structural support 3002. Preferably, these small lengths of ABS pipe are permanently affixed to the pipe couplings 1018 in the front structural support using ABS cement. In turn, pipe caps 4002 are also preferably permanently affixed to the small lengths of ABS pipe that protrude from the pipe couplings 1018.

The eye-bolt portion of the eye-bolt/nut assembly 4004 preferably passes through a hole that is disposed in approximately the center of the circular front structural support 1002, where it is secured in place using the nut portion of the eye-bolt/nut assembly. In alternative embodiments the eye-bolt/nut assembly 4004 may be secured to front structural support 4002 in different locations, although a central location as shown in FIG. 4 is preferred because, as will be explained in further detail below, it provides for an even distribution of force when tensioning device 4008 is tightened.

As shown in FIG. 4, tensioning device 4008 includes two (2) pipe caps 4002 disposed on either end of a relatively short length of pipe 4016 (compared to the length of the front rod supports 1016A-1016D. Preferably, pipe 4016 and pipe caps 4002 are of the same diameter and the same material as rod supports 1016, that is, the pipe 4016 is preferably 1.5" ABS pipe and the pipe caps 4002 are ABS pipe caps designed to fit over 1.5" ABS pipe. Together, the pipe caps 4002 and pipe 4016 of tensioning device 4008 form a cover that protects other components of the tensioning device from the elements. For convenience, the pipe caps 4002 and pipe 4016 that are included in tensioning device 4008 may be collectively referred to as a tensioning device cover for the remainder of this disclosure.

Preferably, pipe 4016 and the pipe cap 4002 that is disposed closest to the fairing 1002 are permanently affixed to each other using ABS cement. As shown in FIG. 5, the pipe cap 4002 that is disposed closest to the fairing 1002 includes a small hole 5006 in the center of the pipe cap that has a diameter sized to allow wire rope 504 to pass through an end of the tensioning device cover.

Preferably, pipe 4016 and the pipe cap 4002 that is disposed closest to the middle structural support 1006 are not permanently affixed, rather, they can be attached and detached from one another by twisting and pulling one relative to the other. Although it is not shown in FIG. 5, the pipe cap 4002 that is disposed closest to the middle structural support 1006 includes another small hole 5006 in the center of the pipe cap that has a diameter sized to allow wire rope 5004 to pass through the other end of the tensioning device cover.

Referring to FIG. 5, some other components included in tensioning device 4008 are now described. Tensioning device 4008 additionally includes swaging sleeves 5002 and three (3) lengths of SS, ⅜" diameter, wire rope 5004. Swaging sleeves 5002, together with wire rope thimbles (not shown) are used to form loops in the ends of the wire ropes 5004. As is well known in the art, wire rope 5004 may be threaded through an appropriately sized swaging sleeve 5002 in order to form a loop. The loop of wire rope 5004 is tightened around a wire rope thimble (not shown), a small teardrop-shaped piece of metal which helps the loop of wire rope maintain its shape. The swaging sleeve 5002 is then crimped, or "swaged", with a conventional swaging tool, which compresses the softer metal of the swaging sleeve 5002 into the valleys of the wire rope 5004, holding the two adjacent sections of wire rope fast to each other, and preventing the adjacent sections of wire rope 5004 from slipping. These loop connections in the wire rope 5004, if done properly with the swaging sleeves 5002 and a conventional swaging tool as described, have about 90% of the strength of the wire rope itself.

Still referring to FIG. 5, tensioning device 4008 additionally includes two swivels 5008, two "Quick-Link" chain links 5010, and a turnbuckle 5012 connected to each other in the manner illustrated in FIG. 5. The swivels 508 allow each end of turnbuckle 5012 to be independently tightened or loosened without twisting the wire ropes 5004. As shown at the upper right corner of FIG. 5, one end of a wire rope 5004 is looped around the middle of another section of wire rope 5004, forming a T-shaped junction. Thus, one end of tensioning device 4008 has a single loop of wire rope 5004, while the other end of tensioning device has two loops of wire rope 5004.

Referring back to FIG. 4, the end of tensioning device 4008 having the single loop of wire rope 5004 is connected to eye-bolt/nut assembly 4004, as indicated by the broken line connecting the single loop to the eye-bolt/nut assembly. Similarly, the other end of the tensioning device 4008 having two loops of wire rope 5004 is each connected to one of the two u-bolts 1020 that are attached to the middle structural support 1006, also indicated by broken lines connecting the loops to the u-bolts.

It should be apparent that the length of the wire rope 5004 that connects at each end to the u-bolts 1020 of middle structural support 1006 need only be just long enough to extend between the two u-bolts. The lengths of the other wire ropes 5004 in tensioning device 4008 are selected such that when turnbuckle 5012 is loosened, there is enough "slack" to allow front rod supports 1016A-1016D to be pulled out, twisted, or otherwise removed from the pipe couplings 1018 in the middle structural support 1006 and the pipe couplings 1018 in the front structural support 3002. On the other hand, when turnbuckle 5012 is tightened, the tension created by the tensioning device 4008 pulls the front structural support 3002 and the middle structural support 1006, removing "slack" from the tensioning device and firmly holding the front rod supports 1016A-1016D within the pipe couplings 1018. By placing eye-bolt/nut assembly 4004 approximately in the center of front structural support 3002, the front structural support is pulled evenly towards the middle structural support 1006.

Tensioning device 4008 is illustrated in FIG. 4 as being above the other illustrated components of transport 1000 only to more clearly illustrate the features of the tensioning device. It should be apparent that when the tensioning device 4008 is attached to the front structural support 3002 and the middle structural support 1006 as described above, the tensioning device cover is suspended in a central location between the front rod supports 1016A-1016D, approximately parallel to the front rod supports.

In FIGS. 4 and 5, a length of the tensioning device cover is about 2' long, which is long enough to enclose the swivels 5008, the "Quick Link" chain links 5010, and the turnbuckle 5012. As illustrated in FIGS. 4 and 5, the tensioning device 4008 is positioned closer to the middle structural support 1006 than the front structural support 3002. Although the opposite is possible in alternative embodiments, the illustrated arrangement is preferred because it minimizes the amount of weight towards the front end of transport 1000.

Lastly, as shown in FIG. 4, floating structural support 1004 includes a small circular hole 4006 in about the center of the floating structural support. The circular hole 4006 has a diameter sized to allow wire rope 5004 to be passed through the floating structural support, so that the floating structural support does not interfere with the operation of the tensioning device 4008.

Figures 6, 7:
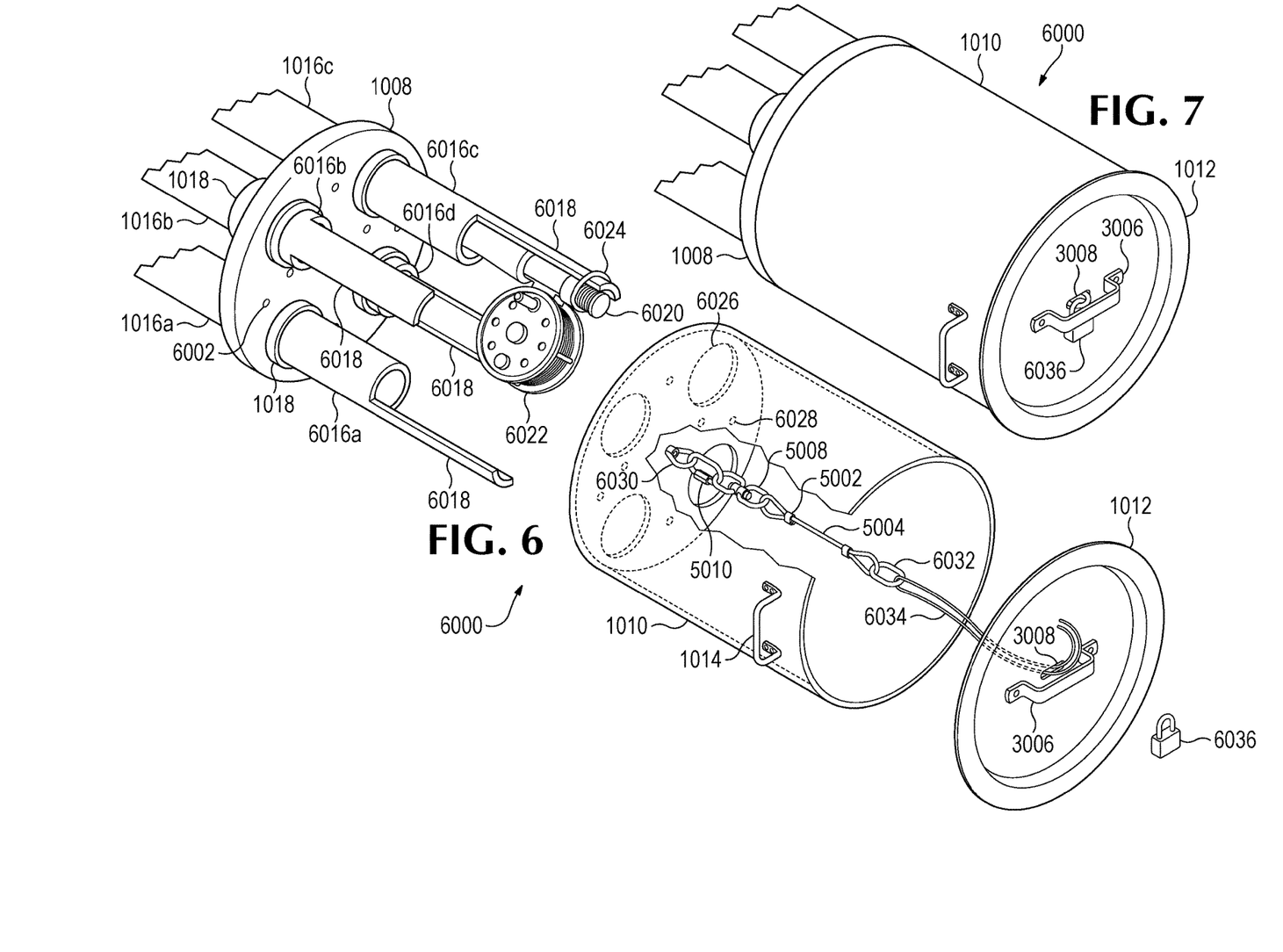
FIG. 6 is a perspective, exploded, partial cut-away diagram that illustrates the fishing rod transport of FIG. 1 in additional detail, and also illustrates an optional locking mechanism in accordance with alternative example embodiments.
FIG. 7 is a perspective diagram that illustrates the fishing rod transport of FIG. 1 in additional detail.
Figures 8, 9, 10, 11:
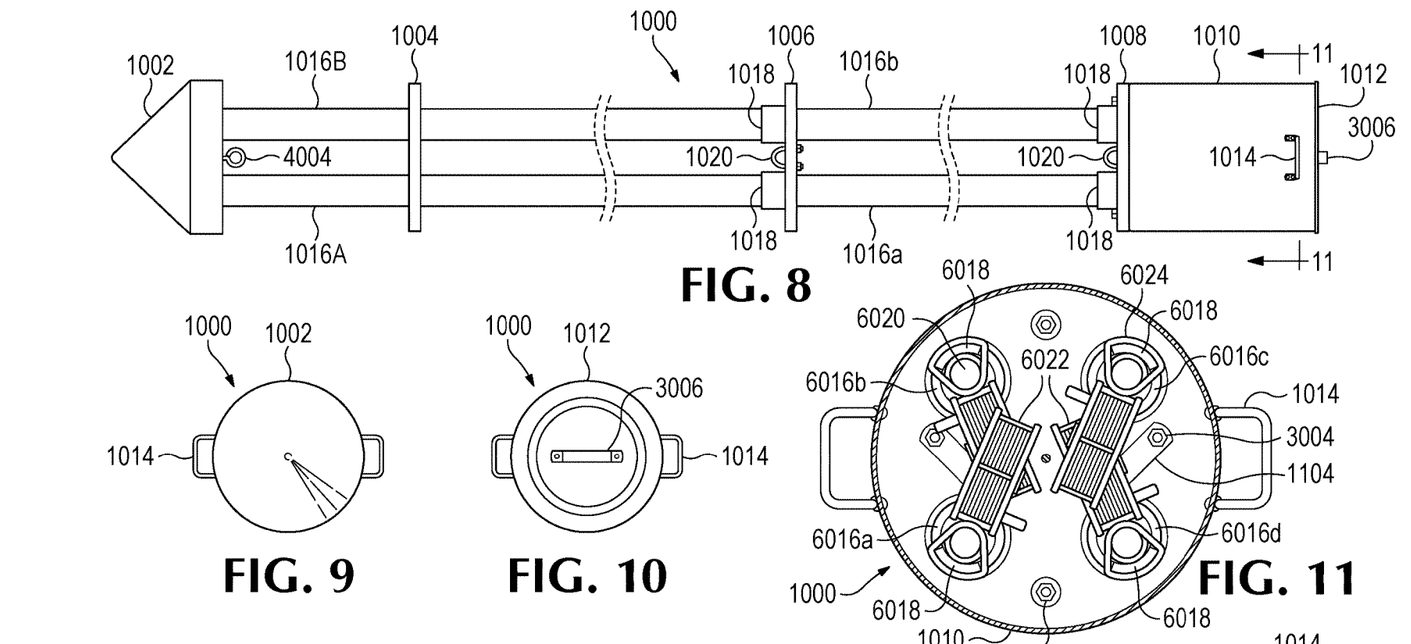
FIG. 8 is a side elevational diagram that illustrates the fishing rod transport of FIG. 1 in additional detail.
FIG. 9 is a front elevational diagram that illustrates the fishing rod transport of FIG. 1 in additional detail.
FIG. 10 is a rear elevational diagram that illustrates the fishing rod transport of FIG. 1 in additional detail.
FIG. 11 is a cross-sectional diagram, taken along line 11 of FIG. 8, that illustrates an interior of the reel compartment of the fishing rod transport of FIG. 1 in additional detail.

FIG. 6 is a perspective, exploded, partial cut-away diagram that illustrates additional, interior components of reel compartment assembly 6000 in additional detail, and also illustrates an optional locking mechanism in accordance with alternative example embodiments. In FIG. 6, a portion of reel compartment 1010 has been removed so that elements of the optional locking mechanism are easily visible, as indicated by a cut-out region of jagged lines extending from the larger opening of reel compartment 1010, where reel compartment cover 1012 fits, towards the opposite end of the reel compartment. It will be understood that in actuality, with the exception of holes 6026 and holes 6028, the purpose and function of which will be explained below, the structural integrity of reel compartment 1010 is not compromised in any other way, as illustrated in FIG. 7. FIG. 7 is a perspective diagram that illustrates reel compartment assembly 6000 in additional detail. FIG. 11 is a cross-sectional diagram, taken along line 11 of FIG. 8, that illustrates an interior of the reel compartment assembly 6000 in additional detail and from a different perspective than FIG. 6. Now, with reference to FIGS. 6, 7, and 11, additional interior components of reel compartment assembly 6000 will be described in greater detail.

FIG. 6 illustrates a number of holes 6002 extending through rear structural support 1008. Some of these holes 6002 accommodate bolts, such as bolts 1022, which were previously illustrated and described with reference to FIG. 1. Other ones of the holes 6002 accommodate u-bolts 1020, which were also previously illustrated and described with reference to FIG. 1. Each one of the holes 6002 in rear structural support 1008 corresponds to a matching hole 6028 that penetrates the circular, closed end of reel compartment 1010. Preferably, a diameter of the holes 6002 is about the same as a diameter of the holes 6028, and is sized to match a diameter of the bolts 1022 or a diameter of the u-bolts 1020, e.g., ¼", ⁵⁄₁₆", ⅜". The number of holes 6002 in the rear structural support 1008 and the number of matching holes 6028 in the reel compartment 1010 is a design choice depending on the number of bolts and u-bolts that are desired, as is the particular placement of the holes 6002, 6028.

The placement of holes 6002, 6028 in rear structural support 1008 and reel compartment 1010 determines the positions of bolts 1022 and u-bolts 1020, the ends of which extend into reel compartment 1010 where they are secured by nuts 3004 as shown in FIG. 11. As shown in FIG. 11, individual washers 1102 may be used in conjunction with the nuts 3004 that are used to secure bolts 1022, while u-bolt backing plates 1104 may be used in conjunction with the nuts 3004 that secure u-bolts 1020. In some alternative embodiments, locking washers (not shown) may additionally be used to help prevent nuts 3004 from loosening due to shock or vibration.

The interior of reel compartment assembly 6000 includes reel stops 6016a, 6016b, 6016c, and 6016d. As shown in FIG. 6, each of the reel stops 6016a-6016d includes a shelf 6018 that extends away from the reel stop, towards the large opening of the reel compartment 1010. As shown in FIG. 11, a cross-section of the shelves 6018 defines a minor segment of the larger circle that is defined by a cross-section of the reel stops 6016.

Each of the reel stops 6016a-6016d may be thought of as having two ends, a circular end and a segment end, which also represents the end of the shelf 6018. The circular end of each of the reel stops 6016 is positioned in one end of a pipe coupling 1018 that is affixed to rear structural support 1008. Thus, each reel stop 6016 is joined to a corresponding one of the rear rod supports 1016 by a pipe coupling 1018. Preferably, the reel stops 6016 are not permanently affixed to the pipe couplings 1018 of the rear structural support 1008. Rather, the reel stops 6016 are simply pushed and/or twisted into the pipe couplings 1018, and are held in place by friction. As will be explained further below, this makes it possible for the reel stops 6016 to be adjusted so that an angle at which a fly-reel 1022 is positioned within reel compartment 1010 is adjustable.

Preferably, each reel stop 6016a-6016d and its corresponding shelf 6018 is fabricated from a single piece of 1.5" ABS pipe, just like the rear rod supports 1016a-1016d and front rod supports 1016A-1016D. Using a piece of 1.5" ABS plastic that is as long as the desired combined length of the reel stop 6016 and shelf 6018, it is relatively easy to cut the shape illustrated for the reel stop 6016 and shelf 6018 from the piece of ABS plastic by performing two cuts with a hacksaw. The first cut is along a chord of the circle formed by a cross-section of the ABS pipe, that is, the circular cross-section of reel stops 6016 as seen in FIG. 11. This cut forms a major and minor segment of the circle. The second cut is performed perpendicular to the first cut in order to remove the major segment that was formed by the first cut, leaving the minor segment behind to form the shelf 6018. The order of the cuts may also be reversed.

FIG. 6 illustrates a fly-reel 6022 attached to a fly-rod 6020. To transport the assembled fly-rod 6020 with fly-reel 6022 attached, an angler simply inserts the tip of fly-rod 6020 into the open end of, as shown in FIG. 6, reel stop 6016c. The angler then pushes or slides the fly-rod forward into the long, tubular, enclosed volume that is defined by reel stop 6016c, corresponding rear rod support 1016c, corresponding front rod support 1016C, and the small length of ABS pipe, terminated by a pipe cap 4002 (FIG. 4) that extends forward into the volume enclosed by fairing 1002.

As seen in FIG. 6, the portion of the reel stops 6016a-6016d where the cross section of the reel stop suddenly transitions from the minor segment of the shelf 2018 to the full circle of the reel stop prevents the fly-reel 6022, and consequently the attached fly-rod 6020, from being inserted any further into transport 1000. Indeed, as illustrated, fly-reel 6022 and fly-rod 6020 could be inserted a bit further into transport 1000, up until the point that fly-reel 6022 contacts the "full circle" of reel stop 6016c, where further forward progress is halted. At this point, the fly-reel 6022 and attached fly-rod 6020 may be secured in transport 1000 by using, for example, elastic band 6024 to securely hold the fly-rod against the shelf 6018.

The reader will notice that a shape of reel stops 6016*b*, 6016*d*, and a shape of reel stops 6016*a*, 6016*c* differ in that the point at which the reel stops 6016*b*, 6016*d* transition from having a cross-section that defines a full circle to having a cross-section that defines a minor segment of a circle (i.e., shelf 6018) is much closer to the rear structural support 1008 than the same transition points on reel stops 6016*a*, 6016*c*. As shown in FIG. 11, this separation between the transition points on adjacent reel stops 6016 provides that the entire volume of reel compartment 1010 can be effectively utilized to accommodate fly-reels 6022 because two of the fly-reels are arranged further inside reel compartment 1010 than the other two fly reels.

This feature is common to other alternative embodiments as well, regardless of the shape of reel compartment 1010, and is advantageous in comparison to other existing fishing rod transports where fly-reels 6022 are arranged horizontally along a single line, which wastes valuable space. By shaping reel stops 6016 such that one fly-reel 6022 is disposed closer (or further away from) rear structural support 1008 than an adjacent fly-reel 6022, two (or more) tiers of fly-reels within reel compartment 1010 can be created by taking advantage of the one direction where there is more than enough extra room to expand, and that is the direction parallel to a length of the transport 1000, as indicated by the arrowheads associated with line 11-11 in FIG. 8.

Referring to FIG. 11, the reader will also observe that fly-reels 6022 are arranged such that they are not aligned parallel to a radius of the circular reel compartment 1010, but rather such that fly-reels disposed in reel stops 6016 that are arranged in the same "tier" are slightly skewed relative to the center such that the fly-reels are disposed approximately parallel to each other. As mentioned above, the exact configuration of the fly-reels 6022 within the reel compartment 1010 may be adjusted because reel stops 6016 are not permanently affixed in pipe couplings 1018 and are capable of being rotated in the pipe couplings to different positions.

In other, alternative embodiments, fly-reels 6022 may all be arranged such that they are disposed approximately parallel to a radius of the circular reel compartment 1010 (but not the same radius), similar to the hands of a clock or wristwatch. However, this would require a slightly larger reel compartment than the configuration shown in FIG. 11. See, e.g., FIGS. 4B and 4C of U.S. Provisional Patent Application Ser. No. 63/035,658.

Referring back to FIG. 6, in addition to holes 6028, the closed circular end of reel compartment 1010 includes four (4) larger circular holes 6026. A diameter of holes 6026 is preferably slightly larger than a diameter of pipe couplings 1018 that are affixed to rear structural support 1008, such that if fly-reel 6022 and fly-rod 6020 were removed from reel stop 6016*c*, reel stops 6016 could be inserted through holes 6026 to align holes 6002 in rear structural support 1008 with holes 6028 in reel compartment 1010. Once holes 6002 and 6028 are aligned, rear structural support 1008 and reel compartment 1010 may be removably affixed to each other using bolts 1022 (FIG. 1) and nuts 3004 (FIG. 3, FIG. 11).

Now, with reference to FIGS. 6 and 7, an optional locking mechanism of reel compartment assembly 6000 in accordance with some alternative embodiments will be described. As shown in FIG. 6, reel compartment assembly 6000 includes a SS eye-nut 6030, a "Quick Link" chain link 5010, a SS swivel 5008, a length of ⅜" SS wire rope 5004, and two swaging sleeves 5002, that together with ⅜" wire rope thimbles (not shown), form loops in the ends of the wire rope. Eye-nut 6030 functions like a regular nut 3004 that was previously described, that is, it secures a bolt 1022 (not shown) in approximately the center of the circular closed end of the reel compartment 1010. As suggested by its name, eye-nut 6030 additionally includes a loop of metal, and Quick Link chain link 5010 attaches one end of a SS ¼" swivel 5008 to the eye-nut. One end of swivel 5008 is linked through a loop of wire rope 5004, and the other loop of wire rope 5004 is attached to a single chain link 6032. Alternative embodiments may utilize more than one chain link 6032.

The length of wire rope 5004 is selected such that when a cord 6034, or alternatively a piece of wire, string, fishing line, shoestring, etc., is looped through chain link 6032 and pulled through slot 3008 in reel compartment cover 1012, wire rope 5004 becomes taut and a portion of chain link 6032 protrudes through slot 3008 when the reel compartment cover 1012 is placed on the open end of reel compartment 1010, as shown in FIG. 7. Preferably, enough of the chain link 6032 protrudes through slot 3008 such that a padlock 6036 may be locked through chain link 6032, thereby securing the reel compartment cover 1012 to the reel compartment 1010. Cover handle 3006 is useful as it may protect padlock 6036 from tampering. Swivel 5008 prevents eye-nut 6030 from being unscrewed by someone simply spinning the reel compartment cover 1012.

Figure 12:
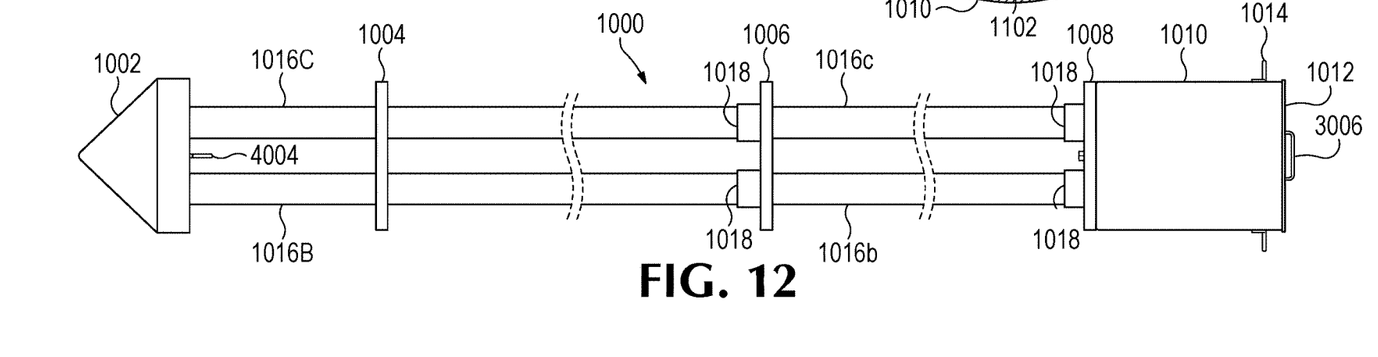
FIG. 12 is a top plan diagram that illustrates the fishing rod transport of FIG. 1 in additional detail.

FIG. 8 is a left side elevational diagram that illustrates some components of fishing rod transport 1000 in additional detail. The corresponding right side elevational diagram (not included) is a mirror image of FIG. 8. FIG. 9 is a front elevational diagram that illustrates some components of fishing rod transport 1000 in additional detail. FIG. 10 is a rear elevational diagram that illustrates some components of fishing rod transport 1000 in additional detail. FIG. 12 is a top plan diagram that illustrates some components of fishing rod transport 1000 in additional detail. The corresponding bottom plan diagram (not included) is identical to FIG. 12. Each element shown in FIGS. 8, 9, 10, and 12 has been described previously with respect to other figures, and a duplicative description will not be repeated here. Together with the perspective view diagrams of FIGS. 1 and 3, FIGS. 8, 9, 10, and 12 are provided in this utility patent application disclosure document primarily to support the subsequent filing of a design patent application.

Manufacturing Techniques

As was mentioned above, one of the desired goals during the build of the Prototype that transport 1000 was based upon was to demonstrate that it could be built using only basic woodworking and metalworking skills, and this writer can assure the reader that this goal was successfully accomplished. Circular structural supports 3002, 1004, 1006, 1008 were cut from ¾" plywood using a router. Smaller holes were drilled through plywood, plastic, and aluminum using a handheld electric drill, a drill press, or in the case of aluminum, a handheld electric drill with a lubricating compound. Larger holes were drilled through plywood using a hole saw on a drill press or a handheld electric drill. Larger holes were drilled through aluminum using and handheld electric drill, a hole saw, and a lubricating compound. ABS plastic was cut to desired lengths and shapes using a hacksaw. Non-circular openings were created in aluminum using by using both a drill with a bit of the appropriate size and a hacksaw. Wire rope was cut with a sharp wire cutter.

Swaging sleeves and a swaging tool was used to form loops in wire rope. Sharp metal edges were taken down with a deburring tool or a file.

It is assumed that the reader is somewhat familiar with all of these tools or techniques, and can recognize which is one appropriate to use for creating the elements of transport 1000 that were described in detail above.

Design Considerations

Transport 1000 was built using circular structural supports 3002, 1004, 1006, 1008 because they paired nicely with the circular base of fairing 1002 as well as the circular base of the aluminum stock pot that formed the reel compartment 1010. There is no particular reason that other shapes could not be used for the structural supports, shapes such as half circles, triangles, squares, rectangles, ovals, etc. For that matter other shapes may be used for the reel compartment 1010, or for the optional fairing 1002. As mentioned above, the materials used to fabricate the various different embodiments may also be varied yet still adhere to inventive aspects exhibited by the disclosed embodiments.

The hardware used in the fabrication of transport 1000, such as u-bolts 1020, bolts 1022, nuts 3004, eye-bolt/nut assembly 4004, wire rope 5004, Quick-Links 5010, turnbuckle 5012, eye-nut 6030, chain link 6032, washers 1102, and u-bolt backing plates 1104 are all COTS components and are obtainable in a variety of sizes, compositions, and coatings. For example, zinc-plated, stainless steel, and galvanized are all options, although stainless steel and galvanized offer superior rust protection. The particular size, length, and type of hardware used is a matter of design choice and many options are suitable for fabricating fishing rod transports in accordance with the disclosed embodiments.

Those of skill in the art will recognize that many of the physical dimensions of the transport 1000 can be modified based upon different sized fishing rods and fishing reels. For example, while transport 1000 was built with extremely long fly-rods in mind, it could easily be scaled down to accommodate shorter spinning rods (about 6' to 7') and their attached spinning reels. It is assumed that the reader has a firm understanding of basic geometry and knows how to calculate, e.g., what particular shape and size is needed for fairing 1002, the number, OD, and length of the rod supports 1016, the shape and overall size of the reel compartment 1010 based upon the average size of the fishing reels that will be carried, etc., based upon the type and number of fishing rods that the angler desires to carry in a fishing rod transport built using the blueprint provided by transport 1000. For additional discussion regarding other specific geometries for example embodiments, please refer to U.S. Provisional Patent Application Ser. No. 63/035,658.

According to preferred embodiments, the holes that are formed in circular structural supports, such as front structural support 3002, floating structural support 1004, middle structural support 1006, and rear structural support 1008 are evenly spaced around a center of the support. That is to say, a 90° separation when four rod supports 1016 are utilized, a 45° separation when eight rod supports are utilized, etc.

In addition to the considerations specified above, various additional changes and modifications to the embodiments of the present disclosure described herein will be apparent to those skilled in the art. Such changes and modifications can be made without departing from the spirit and scope of the disclosed subject matter and without diminishing its intended advantages. It is therefore intended that such changes and modifications be covered by the appended claims.

What is claimed is:

1. A fishing rod transport comprising:
a rear structural support comprising a front surface, a rear surface, a thickness between the front and rear surfaces, and defining a plurality of circular holes extending completely through the thickness of the rear structural support from the front surface to the rear surface, wherein the front and rear surfaces are substantially parallel to each other;
a reel compartment defining an interior space within the reel compartment, the reel compartment comprising a front wall disposed at a proximal end of the reel compartment and defining a plurality of circular holes extending completely through the front wall, the reel compartment further comprising a distal opening disposed at a distal end of the reel compartment, the reel compartment further comprising a side wall between the front wall and the distal end of the reel compartment, wherein the front wall of the reel compartment is permanently attached to the sidewall of the reel compartment; and
a plurality of rod supports attached to the rear structural support, each rod support having a hollow cylindrical shape, each rod support extending through one of the holes defined by the rear structural support, wherein a first rod support extends through a first hole defined by the rear structural support and into the interior space within the reel compartment, a second rod support extends through a second hole defined by the rear structural support and into the interior space within the reel compartment, wherein a distance from the rear surface of the rear structural support to a distal end of the one of the rod supports is greater than a distance from the rear surface of the rear structural support to a distal end of the another one of the rod supports.

2. The fishing rod transport of claim 1, the circular holes defined by the front wall of the reel compartment providing access to the interior space defined by the reel compartment, the rod supports disposed such that a hollow reel stop portion of each of the rod supports extends from a corresponding one of the circular holes defined by the front wall of the reel compartment into the interior space of the reel compartment.

3. The fishing rod transport of claim 2, wherein the hollow reel stop portions of the rod supports define an opening at a distal end of the reel stop portions, the openings of the reel stop portions disposed such that a distance from each one of the circular holes defined by the front wall of the reel compartment to the opening defined by a corresponding reel stop portion that is associated with the circular holes defined by the front wall of the reel compartment is greater than zero.

4. The fishing rod transport of claim 3, wherein the reel stop portions are disposed within the interior space of the reel compartment such that a first distance between a first circular hole defined by the front wall of the reel compartment and the opening defined by a reel stop portion corresponding to the first circular hole in the front wall of the reel compartment is greater than a second distance between a second circular hole defined by the front wall of the reel compartment and the opening defined by a reel stop portion corresponding to the second circular hole defined by the front wall of the reel compartment.

5. The fishing rod transport of claim 1, wherein a thickness of the front wall of the reel compartment is substantially the same as a thickness of the side wall of the reel compartment.

6. The fishing rod transport of claim 5, wherein the front wall of the reel compartment and the side wall of the reel compartment constitute a single integral structure.

7. The fishing rod transport of claim 1, wherein when the fishing rod transport is assembled, the front wall of the reel compartment contacts the rear surface of the rear structural support.

8. A fishing rod transport comprising:
a reel compartment that is hollow and defines an interior volume inside the reel compartment, the reel compartment comprising proximal reel compartment openings located at a proximal end of the reel compartment that provide access to the interior volume inside the reel compartment from a region outside the reel compartment, the reel compartment further comprising a distal reel compartment opening located at a distal end of the reel compartment that provides access to the interior volume inside the reel compartment from the region outside the reel compartment;
reel stops attached to the reel compartment and having a hollow and tubular construction, each reel stop extending from a corresponding one of the proximal reel compartment openings into the interior volume defined by the reel compartment, each reel stop arranged such that an opening at one end of each reel stop is located opposite a corresponding proximal reel compartment opening and at a distance from the corresponding proximal reel compartment opening that is greater than zero, wherein a distal end of a first reel stop is located at a further distance away from its reel stop opening than a distal end of a second reel stop from its reel stop opening; and
rod supports attached to the reel compartment and having a hollow and tubular construction, each rod support extending from a corresponding one of the proximal reel compartment openings and away from the interior volume defined by the reel compartment, the rod supports and reel stops arranged such that a hollow space defined by each of the rod supports and a hollow space defined by a corresponding one of the reel stops forms one continuous hollow space that is disposed partially within the reel compartment, such that the hollow spaces defined by the reel stops are disposed within the interior volume of the reel compartment but the hollow spaces defined by the rod supports are disposed outside the interior volume of the reel compartment.

9. The fishing rod transport of claim 8, wherein the reel stops are disposed such that a first distance between the opening of a first reel stop and the distal reel compartment opening is greater than a second distance between the corresponding opening of a second reel stop and the distal reel compartment opening.

10. The fishing rod transport of claim 8, further comprising a structural support that is attached to each of the rod supports.

11. The fishing rod transport of claim 10, wherein the structural support comprises structural support openings extending completely through a thickness of the structural support, wherein each of the rod supports is attached to the structural support such that it passes through a corresponding one of the structural support openings.

12. The fishing rod transport of claim 11, wherein the structural support openings are evenly spaced around a center of the structural support.

13. The fishing rod transport of claim 7, wherein the structural support is affixed to the reel compartment such that a surface of the structural support abuts the proximal end of the reel compartment.

14. A fishing rod transport comprising:
a reel compartment that is hollow and defines an interior volume inside the reel compartment, the reel compartment comprising proximal reel compartment openings disposed on a proximal end of the reel compartment and a distal reel compartment opening disposed on a distal end of the reel compartment, the proximal reel compartment openings and the distal reel compartment opening providing access to the interior volume inside the reel compartment from a region outside the reel compartment; and
reel stops attached to the reel compartment and having a hollow and tubular construction, each reel stop having at least one opening that is large enough to allow a fishing rod to be inserted inside the reel stop but prevents a reel attached to the fishing rod from entering the reel stop, each reel stop extending from a corresponding one of the proximal reel compartment openings into the interior volume defined by the reel compartment, wherein the reel stops are disposed such that a first distance between the at least one opening that is closest to a distal end of a first reel stop and the distal reel compartment opening is greater than a second distance between the at least one opening that is closest to a distal end of a second reel stop and the distal reel compartment opening.

15. The fishing rod transport of claim 14, further comprising rod supports attached to the proximal end of the reel compartment and having a hollow and tubular construction, each rod support extending from a corresponding one of the proximal reel compartment openings and away from the interior volume defined by the reel compartment, the rod supports and reel stops arranged such that a hollow space defined by each of the rod supports and a hollow space defined by a corresponding one of the reel stops forms one continuous hollow space that is disposed partially within the reel compartment, such that the hollow spaces defined by the reel stops are disposed within the interior volume of the reel compartment but the hollow spaces defined by the rod supports are disposed outside the interior volume of the reel compartment.

16. The fishing rod transport of claim 14, wherein each reel stop is arranged such that an opening at a distal end of each reel stop is located opposite a corresponding proximal reel compartment opening and at a distance from the corresponding proximal reel compartment opening that is greater than zero.

17. The fishing rod transport of claim 15, wherein each of the rod supports and a corresponding reel stop is formed from a single tube having a circular cross-section.

* * * * *